(12) United States Patent
Woodbridge (10) Patent No.: US 10,916,843 B1
(45) Date of Patent: Feb. 9, 2021

(54) METHOD AND SYSTEM TO REDUCE THE IMPACT OF ELECTROMAGNETIC PULSES ON CELLULAR TOWER SITES

(71) Applicant: Terrance O'Brien Woodbridge, Cary, NC (US)

(72) Inventor: Terrance O'Brien Woodbridge, Cary, NC (US)

( * ) Notice: Subject to any disclaimer, the term of this patent is extended or adjusted under 35 U.S.C. 154(b) by 0 days.

(21) Appl. No.: 16/666,741

(22) Filed: Oct. 29, 2019

(51) Int. Cl.
| | |
|---|---|
| *H01Q 1/52* | (2006.01) |
| *H01Q 7/00* | (2006.01) |
| *H04W 24/04* | (2009.01) |
| *H04W 88/08* | (2009.01) |
| *H04B 10/2575* | (2013.01) |
| *H01Q 1/24* | (2006.01) |
| *H02H 7/20* | (2006.01) |

(Continued)

(52) U.S. Cl.
CPC ............. *H01Q 1/526* (2013.01); *H01Q 1/246* (2013.01); *H01Q 7/00* (2013.01); *H04B 10/25759* (2013.01); *H04W 24/04* (2013.01); *H04W 88/085* (2013.01); *H01C 7/12* (2013.01); *H02H 7/04* (2013.01); *H02H 7/20* (2013.01)

(58) Field of Classification Search
CPC .......... H01Q 1/526; H01Q 1/246; H01Q 7/00; H04W 88/085; H04W 24/04; H04B 10/25759; H01C 7/12; H02H 9/06; H02H 1/00; H02H 1/04; H02H 3/22; H02H 9/04
USPC ........................................................ 398/116
See application file for complete search history.

(56) References Cited

U.S. PATENT DOCUMENTS

| | | | |
|---|---|---|---|
| 8,497,813 B2* | 7/2013 | Rodger .................. | H01Q 1/246 343/872 |
| 9,425,614 B2* | 8/2016 | Xiong ...................... | H02H 9/04 |
| 9,661,686 B2* | 5/2017 | Berg ........................ | H04B 1/38 |

(Continued)

FOREIGN PATENT DOCUMENTS

| | | |
|---|---|---|
| CN | 202261650 | 5/2012 |
| EP | 1766855 | 3/2007 |

OTHER PUBLICATIONS

Antunes et al., Dynamic Structural Health Monitoring of Slender Structures Using Optical Sensors, 2012, 12, 3629-6644; doi:10.3390/s120506629.

(Continued)

*Primary Examiner* — Abbas H Alagheband
(74) *Attorney, Agent, or Firm* — Wiley Rein LLP (57) ABSTRACT

Cellular tower sites generally include a remote radio head conductively connected to a base station. A system for protecting the site from an electromagnetic pulse ("EMP") includes an antenna array; an EMP detection circuit in communication with the antenna array; and a disconnect switch in communication with the EMP detection circuit. The disconnect switch is conductively connected between the remote radio head and the base station; when opened, it physically interrupts the connection between the remote radio head and the base station. For instance, if a comparison, within the EMP detection circuit, between the pulse duration and/or frequency of an electromagnetic signal received by the antenna array to the frequency and/or pulse duration of an EMP E3 signal component determines a match, the EMP detection circuit can output an EMP detection signal to the disconnect switch, thereby disconnecting the remote radio head from the base station.

17 Claims, 5 Drawing Sheets

(51) Int. Cl.
  *H02H 7/04* (2006.01)
  *H01C 7/12* (2006.01)

(56) References Cited

U.S. PATENT DOCUMENTS

| | | | |
|---|---|---|---|
| 10,183,761 B2 * | 1/2019 | Priest | B25J 5/00 |
| 2004/0121742 A1 * | 6/2004 | Abrams | H04B 1/0466 |
| | | | 455/115.1 |
| 2004/0174542 A1 | 9/2004 | Handman et al. | |
| 2006/0201498 A1 | 9/2006 | Olsson et al. | |
| 2007/0210808 A1 | 9/2007 | Yang | |
| 2008/0012720 A1 * | 1/2008 | Rostron | G01R 15/14 |
| | | | 340/664 |
| 2010/0238450 A1 | 9/2010 | Wang et al. | |
| 2013/0083664 A1 | 4/2013 | Harris et al. | |
| 2015/0189406 A1 | 7/2015 | Forslund et al. | |
| 2015/0349912 A1 | 12/2015 | Komi et al. | |
| 2016/0156412 A1 | 6/2016 | Suzuki et al. | |
| 2016/0161966 A1 * | 6/2016 | Gil | G05F 1/66 |
| | | | 700/291 |
| 2017/0084996 A1 * | 3/2017 | Shen | H01Q 1/246 |
| 2018/0337526 A1 * | 11/2018 | Al-Mufti | H02H 1/0007 |
| 2019/0036326 A1 * | 1/2019 | Anderson | H02H 3/22 |
| 2019/0221529 A1 * | 7/2019 | Yong | H01L 23/552 |
| 2020/0106262 A1 * | 4/2020 | Anderson | H02H 7/0455 |
| 2020/0252144 A1 * | 8/2020 | Levesque | H04B 1/1027 |

OTHER PUBLICATIONS

Kiremidjian et al., Structural Damage Monitoring for Civil Structures, 1997.

\* cited by examiner

METHOD AND SYSTEM TO REDUCE THE IMPACT OF ELECTROMAGNETIC PULSES ON CELLULAR TOWER SITES

CROSS-REFERENCE TO RELATED APPLICATIONS

This application is related to U.S. application Ser. No. 14/157,775, filed 17 Jan. 2014, which is hereby incorporated by reference as though fully set forth herein.

BACKGROUND

The present disclosure relates generally to cellular tower equipment. In particular, the present disclosure relates to protecting cellular tower equipment from electromagnetic pulse ("EMP") events.

An EMP event generates a broad band signal, ranging in frequency from about 200 MHz to about 1 GHz. It is known that exposure to EMP events, whether naturally occurring (e.g., lightning, coronal mass ejection) or man-made (e.g., nuclear EMP), can interfere with, damage, or even destroy electronic equipment.

The International Electrotechnical Commission ("IEC") defines a man-made EMP signal to include three components—E1, E2, and E3. E1 is the highest frequency (about 1 GHz) component and is made up of a short duration pulse. Thus, an upper atmospheric E1 component is less likely to damage electronics on the ground.

The E2 component is an intermediate time pulse that lasts from about 1 μsec to about 1 sec and has many similarities to EMP produced by lightning. Thus, lightning protection technology can also mitigate the impact of the E2 component.

The E3 component has a lower frequency with longer wavelengths and a much slower pulse. As such, the E3 component can have the largest impact on electronics located on the ground.

Cellular towers include cellular antennas and remote radio heads located on the tower structure, generally between about 60 feet and about 300 feet above ground level. The cellular antennas are connected to the remote radio heads via coaxial cables. The remote radio heads, in turn, have two connections to base station equipment on the ground—a power connection and a communication connection. The communication connection is often an optical connection that carries data between the remote radio head and the base station. The power connection, however, is typically a metallic cable that carries power to the remote radio head from the ground equipment.

Thus, the power connection poses a risk in case of an EMP event. In particular, the E3 component can propagate through the power connection and damage or destroy the base station, the remote radio head, and/or the cellular antennas.

Studies of the E3 component, however, have shown that, if an electronic device is not connected to any large conductive lines and is non-powered, the impact of the E3 component can be substantially mitigated.

BRIEF SUMMARY

Disclosed herein is a system for protecting a cellular tower site, including a remote radio head conductively connected to a base station, from an electromagnetic pulse ("EMP") event. The system includes: an antenna array; an EMP detection circuit in communication with the antenna array and operable to output an EMP detection signal; and a disconnect switch in communication with the EMP detection circuit, wherein the disconnect switch is configured to be conductively connected between the remote radio head and the base station, and wherein the disconnect switch is configured to physically interrupt the conductive connection between the remote radio head and the base station upon receipt of the EMP detection signal from the EMP detection circuit.

In embodiments of the disclosure, the antenna array includes a plurality of magnetic loop antennas. It is contemplated that the plurality of magnetic loop antennas may be EMP-shielded. Likewise, the EMP detection circuit may be contained within an EMP-shielded enclosure.

It is desirable for the disconnect switch to be an electromechanical switch. It is also desirable to configure the disconnect switch to physically interrupt the conductive connection between the remote radio head and the base station when power to the disconnect switch is interrupted.

According to aspects of the instant disclosure, the EMP detection circuit is connected to the disconnect switch via an optical connection.

In additional aspects of the disclosure, the EMP detection circuit includes a comparator configured to compare an electromagnetic signal received by the antenna array to a reference signal. More particularly, the comparator can be configured to compare a frequency and/or pulse duration of the electromagnetic signal received by the antenna array to a frequency and/or pulse duration of the reference signal. The reference signal can be an EMP E3 signal component, such that the EMP detection circuit outputs the EMP detection signal when a pulse duration and/or frequency of the electromagnetic signal received by the antenna array matches a pulse duration and/or frequency of the EMP E3 signal component.

Also disclosed herein is a method of protecting a cellular tower site from an electromagnetic pulse ("EMP") event, wherein the cellular tower site includes a remote radio head conductively connected to a base station. The method includes connecting an EMP monitoring system to the cellular tower site. The EMP monitoring system includes: an antenna array; an EMP detection circuit in communication with the antenna array and operable to output an EMP detection signal; and a disconnect switch in communication with the EMP detection circuit, wherein the disconnect switch is conductively connected between the remote radio head and the base station. The method further includes: monitoring electromagnetic signals received at the antenna array via the EMP detection circuit to detect an EMP event; the EMP detection circuit outputting the EMP detection signal to the disconnect switch when the EMP detection circuit detects the EMP event; and the disconnect switch operating to physically interrupt the conductive connection between the remote radio head and the base station upon receipt of the EMP detection signal from the EMP detection circuit.

The step of monitoring electromagnetic signals received at the antenna array via the EMP detection circuit can include the EMP detection circuit comparing an electromagnetic signal received at the antenna array to a reference signal. The reference signal may be an EMP E3 signal component. Thus, for example, the EMP detection circuit may output the EMP detection signal to the disconnect switch when a pulse duration and/or frequency of the electromagnetic signal received at the antenna array matches a pulse duration and/or frequency of the EMP E3 signal component.

It is also contemplated that the method can include the disconnect switch operating to physically interrupt the conductive connection between the remote radio head and the base station when power to the disconnect switch is interrupted.

Furthermore, the method can include the disconnect switch operating to physically restore the conductive connection between the remote radio head and the base station after the EMP event has abated.

The instant disclosure also provides a cellular tower site, including: a base station; a remote radio head conductively connected to the base station; an antenna array; an EMP detection circuit in communication with the antenna array and operable to output an EMP detection signal; and a disconnect switch in communication with the EMP detection circuit and conductively connected in series between the base station and the remote radio head, wherein the disconnect switch is configured to open the conductive connection between the remote radio head and the base station upon receipt of the EMP detection signal from the EMP detection circuit. The disconnect switch can also be configured to open the conductive connection between the remote radio head and the base station when power to the disconnect switch is interrupted.

The foregoing and other aspects, features, details, utilities, and advantages of the present invention will be apparent from reading the following description and claims, and from reviewing the accompanying drawings.

While multiple embodiments are disclosed, still other embodiments of the present disclosure will become apparent to those skilled in the art from the following detailed description, which shows and describes illustrative embodiments. Accordingly, the drawings and detailed description are to be regarded as illustrative in nature and not restrictive.

DETAILED DESCRIPTION

The instant disclosure provides apparatus and methods for protecting electronics from damage during electromagnetic pulse ("EMP") events. For purposes of illustration, aspects of the disclosure will be described with respect to protecting cellular tower equipment (e.g., cellular antennas, remote radio heads, and base station equipment) from man-made EMP events. It should be understood, however, that the teachings herein can be applied to good advantage in other contexts, including, without limitation, electrical power substations, satellites, oil rigs, and other critical infrastructure (e.g., civilian and/or military power and/or communications equipment networks). Those of ordinary skill in the art will understand from the following disclosure how to extend the teachings herein into such additional contexts.

Figure 1:
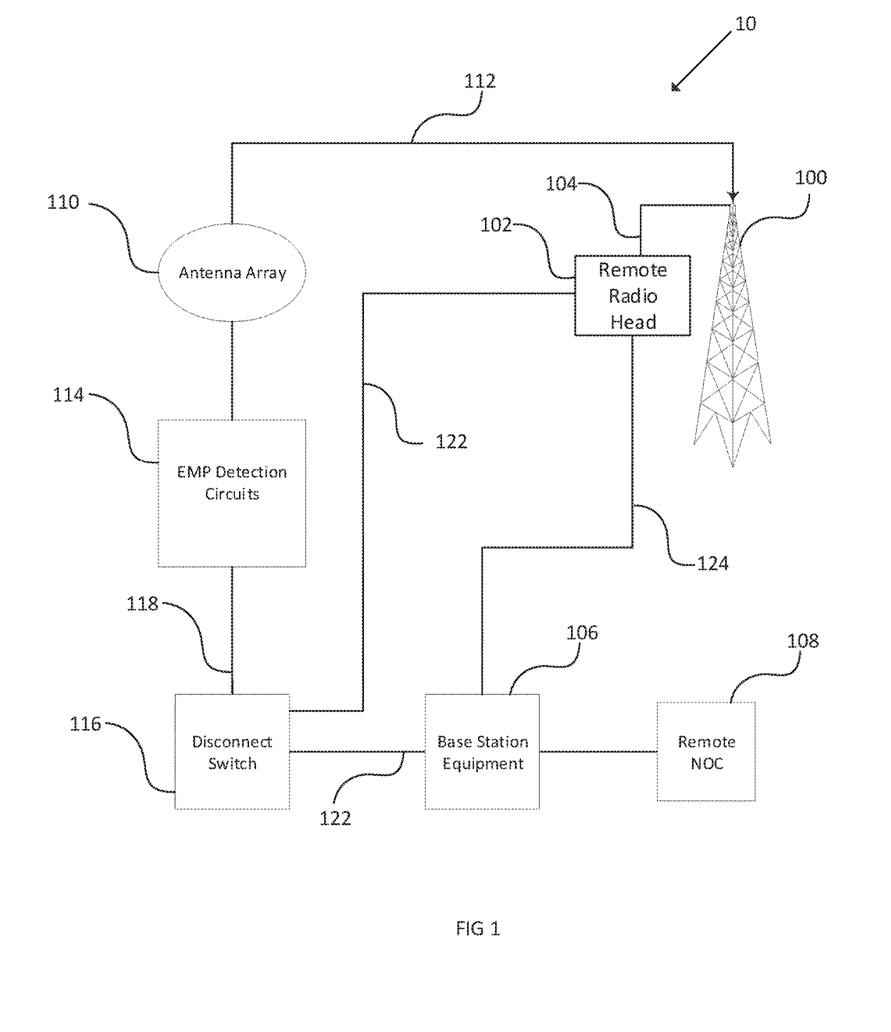
FIG. 1 is a block diagram of a cellular tower site incorporating an EMP protection system according to aspects of the instant disclosure.

FIG. 1 schematically depicts a cellular tower site 10. Insofar as those of ordinary skill in the art will be generally familiar with cellular tower sites, the layer out of cellular tower site 10 will only be explained herein to the extent necessary to understand the instant teachings.

Cellular tower site 10 includes a tower 100. Cellular tower site 10 also includes a remote radio head 102, the details of which will be familiar to those of ordinary skill in the art. Arrowhead 104 represents that remote radio head 102 is mounted on tower 100 (e.g., at or near the top of tower 100).

Base station equipment 106, the details of which will likewise be familiar to the ordinarily skilled artisan, is likewise present at cellular tower site 10. Base station equipment 110 can be connected to a remote Network Operations Center ("NOC") 108, such as by a fiber optic connection.

Cellular tower site 10 further includes a system to protect the equipment thereat, and in particular remote radio head 102 and base station equipment 106, from an EMP event. Thus, an antenna array 110 is mounted on tower 100 (e.g., at or near the top of tower 100), as represented by arrowhead 112 in FIG. 1.

Figure 2A:
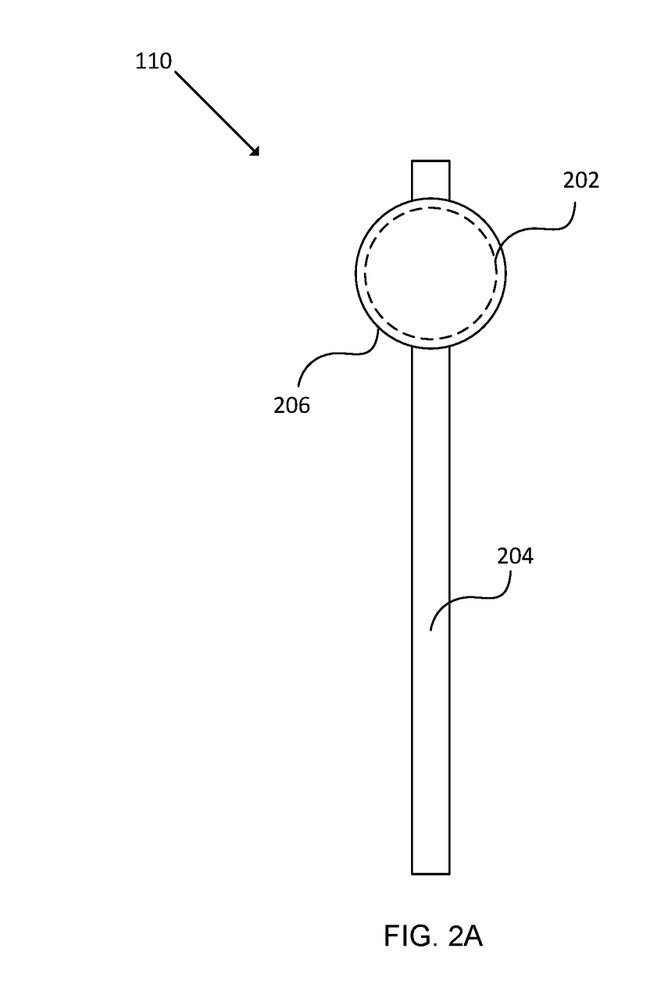
FIGS. 2A and 2B depict, in front and top views, respectively, an illustrative antenna array for use in connection with an EMP protection system according to aspects of the instant disclosure.
Figure 2B:
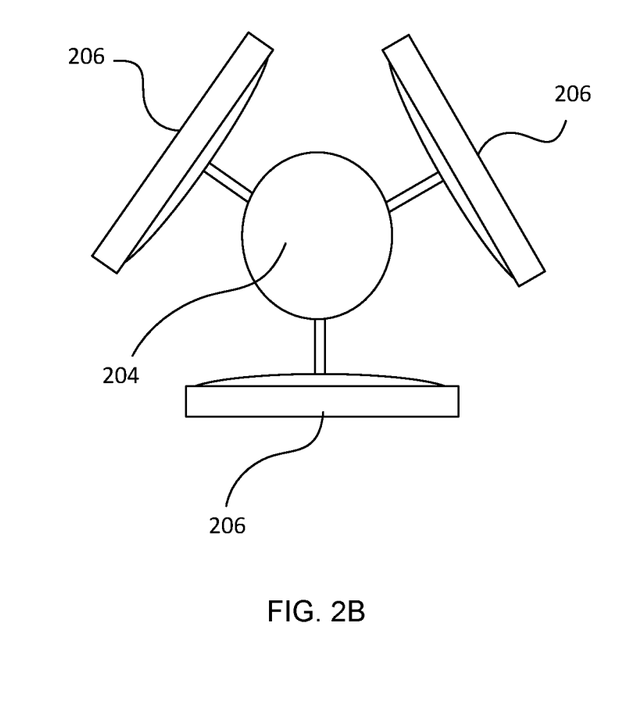

As shown in FIGS. 2A and 2B, antenna array 110 includes a plurality of magnetic loop antennas 202 mounted to a mast 204. Each antenna 202 is, in turn, enclosed within an EMP-shielded enclosure 206. Antennas 202 can be oriented to permit a 360 degree field of detection. For instance, as shown in FIG. 2B, an array 110 of three antennas 202 can be oriented at 120 degree intervals. It should be understood, however, that this configuration is merely exemplary, and that other configurations, including those that incorporate more or fewer antennas 202 and/or utilize different orientations of antennas 202, are within the scope of the instant disclosure.

Figure 3:
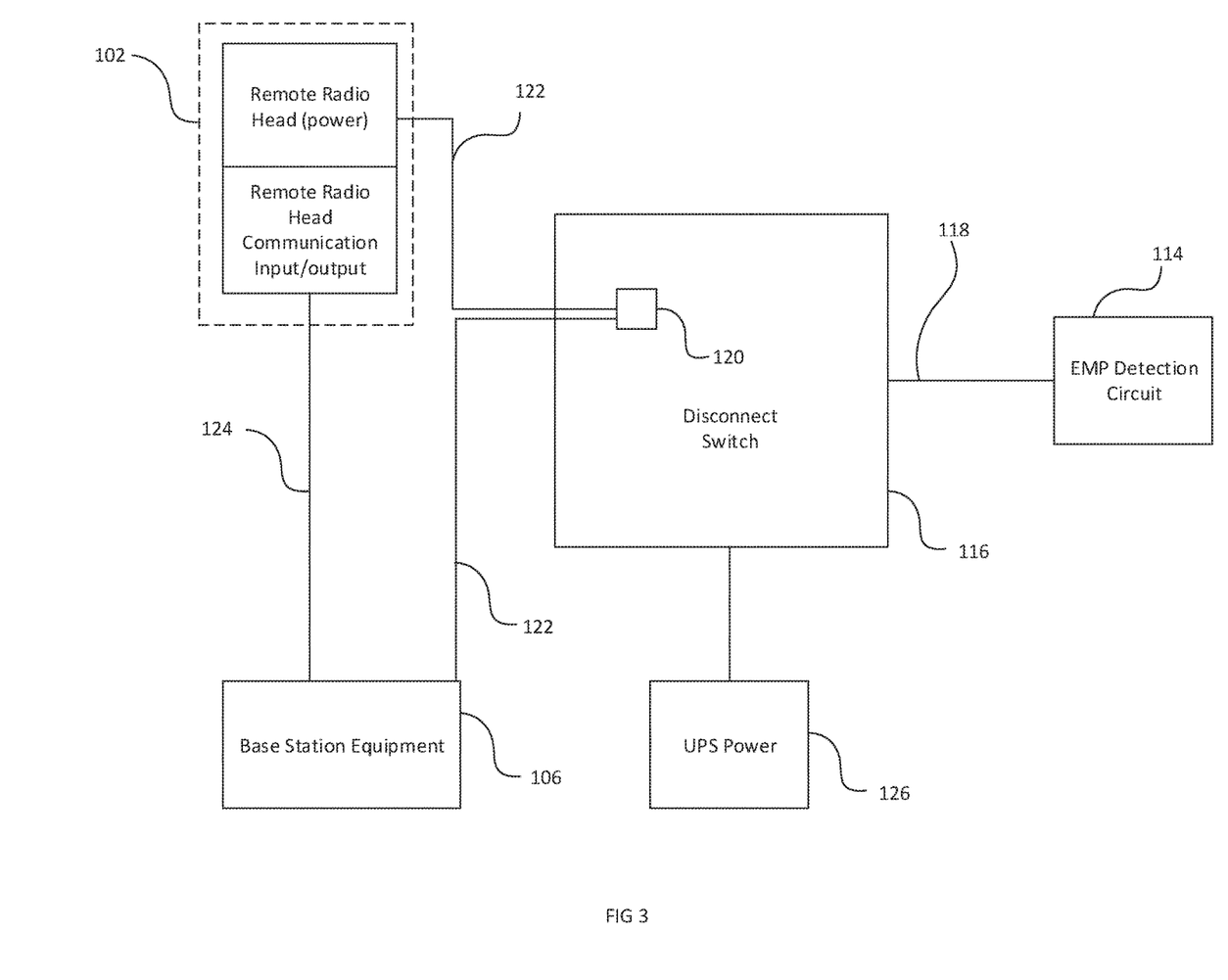
FIG. 3 is a block diagram illustrating interconnections between an EMP protection system as disclosed herein and cellular equipment.

As illustrated in FIG. 1, and further illustrated in FIG. 3, an EMP detection circuit 114 is in communication with antenna array 110. EMP detection circuit 114 can be EMP-shielded (that is, placed within an EMP-shielded enclosure). In general, EMP detection circuit 114 is operable to output an EMP detection signal when a potentially dangerous EMP signal is received by antenna array 110; additional details regarding EMP detection circuit 114 will be discussed below.

A disconnect switch 116 is in communication with EMP detection circuit 114, in particular to receive the EMP detection signal therefrom. In embodiments of the disclosure, disconnect switch 116 and EMP detection circuit communicate via an optical connection 118, which reduces interference from and possible damage due to an EMP event. Likewise, it is desirable for disconnect switch 116 to incorporate one or more electromechanical switches 120, which are more resistant to EMP effects than, for example, solid state electronics.

Disconnect switch 116 is conductively connected between remote radio head 102 and base station equipment 106. That is, the power connection 122 between remote radio head 102 and base station equipment 106 runs through disconnect switch 116, and more particularly through electromechanical switches 120.

Thus, as described in further detail below, disconnect switch 116 is operable to physically interrupt the conductive connection between remote radio head 102 and base station equipment 106, such as by opening electromechanical switches 120, when EMP detection circuit 114 detects an EMP event and outputs the EMP detection signal. By isolating remote radio head 102 from base station equipment 106 during an EMP event, the potential damage to both from the EMP event is reduced.

On the other hand, and as described above, communication between remote radio head 102 and base station equipment 106 is over an optical connection 124.

Power for disconnect switch 116 can be provided by a shielded and hardened uninterruptible power source ("UPS") 126. UPS 126 can include, for example, battery and/or generator backups.

According to embodiments of the disclosure, electromechanical switches 120 of disconnect switch 116 can be set in a failsafe configuration relative to power from UPS 126. That is, disconnect switch 116 can be configured to physically interrupt the conductive connection between remote radio head 102 and base station equipment 106, such as by opening electromechanical switches 120, when power to disconnect switch 116 is interrupted.

Figure 4:
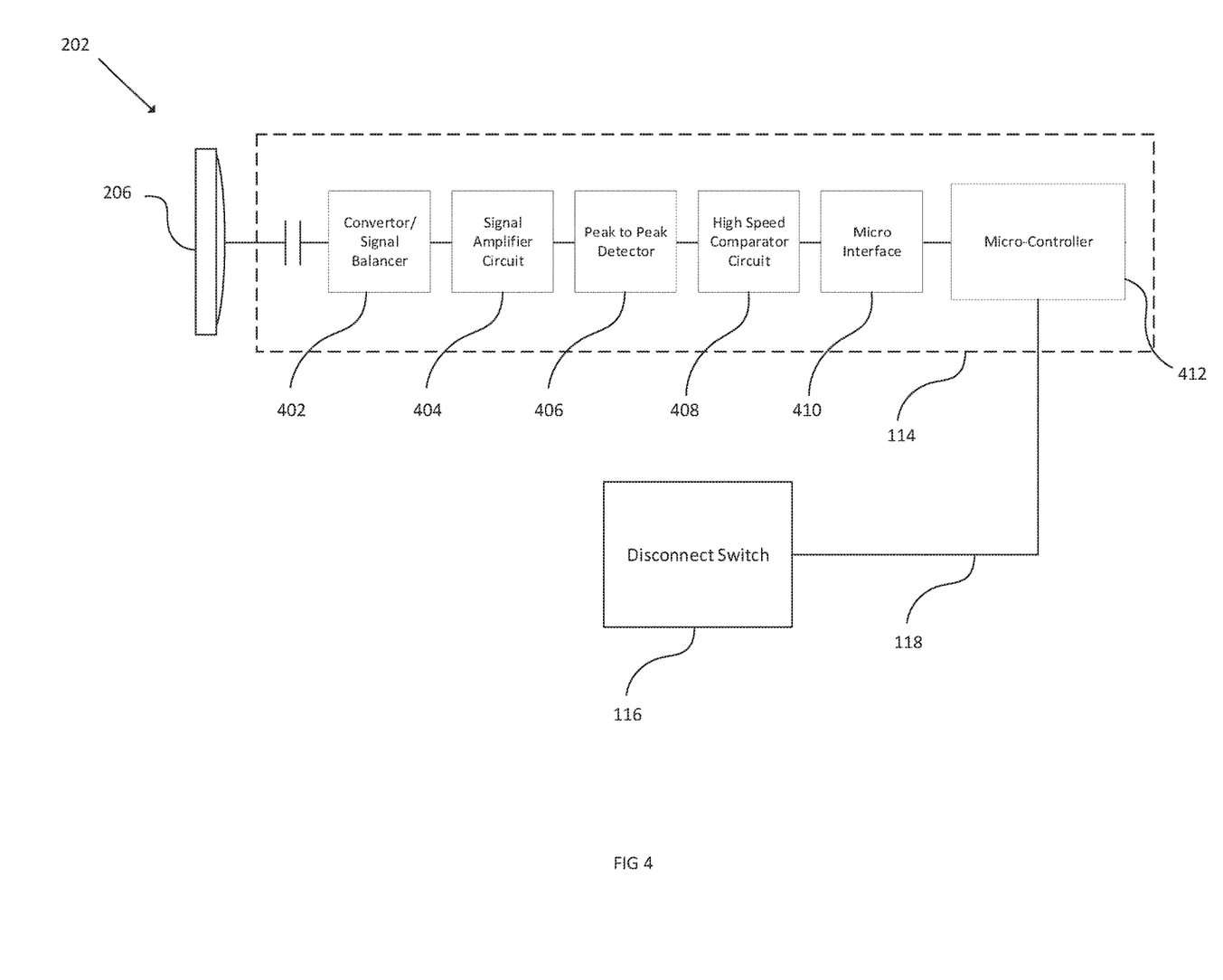
FIG. 4 is a block diagram of an embodiment of an EMP protection system as disclosed herein, illustrating in particular additional details of an EMP detection circuit according to aspects of the teachings herein.

FIG. 4 depicts additional details of EMP detection circuit 114. Antenna 202 receives an electromagnetic signal and passes it to a converter/balancing circuit 402, which conditions the signal and outputs the conditioned signal to an amplifier 404. The amplified signal is then input to a peak-to-peak detector 406.

Low frequency peak levels are passed by peak-to-peak detector 406 to a comparator 408. Comparator 408 compares aspects of the received electromagnetic signal (as conditioned, amplified, and filtered) to the corresponding aspects reference signal, such as a reference EMP E3 signal component. For instance, comparator 408 can compare the frequency, amplitude, and/or pulse duration of the received electromagnetic signal to the characteristic frequency, amplitude, and/or pulse duration of an EMP E3 signal component. As those of ordinary skill in the art will recognize, an EMP E3 signal component can have a pulse duration of longer than about 1,000 seconds but less than about 5,000 seconds and a frequency of less than about 1 Hz.

The output of comparator 408 is passed through an interface 410 to a microcontroller 412. Microcontroller 412, in turn, is configured to determine whether the received electromagnetic signal is innocuous or a potential EMP event based on the output of comparator 408. For instance, if the pulse duration and/or frequency of the received electromagnetic signal are similar to the characteristic pulse duration and/or frequency of an EMP E3 signal component (e.g., pulse duration between about 1,000 seconds and about 5,000 seconds; frequency less than about 1 Hz), then microcontroller 412 can output the EMP detection signal to disconnect switch 116.

Figure 5:
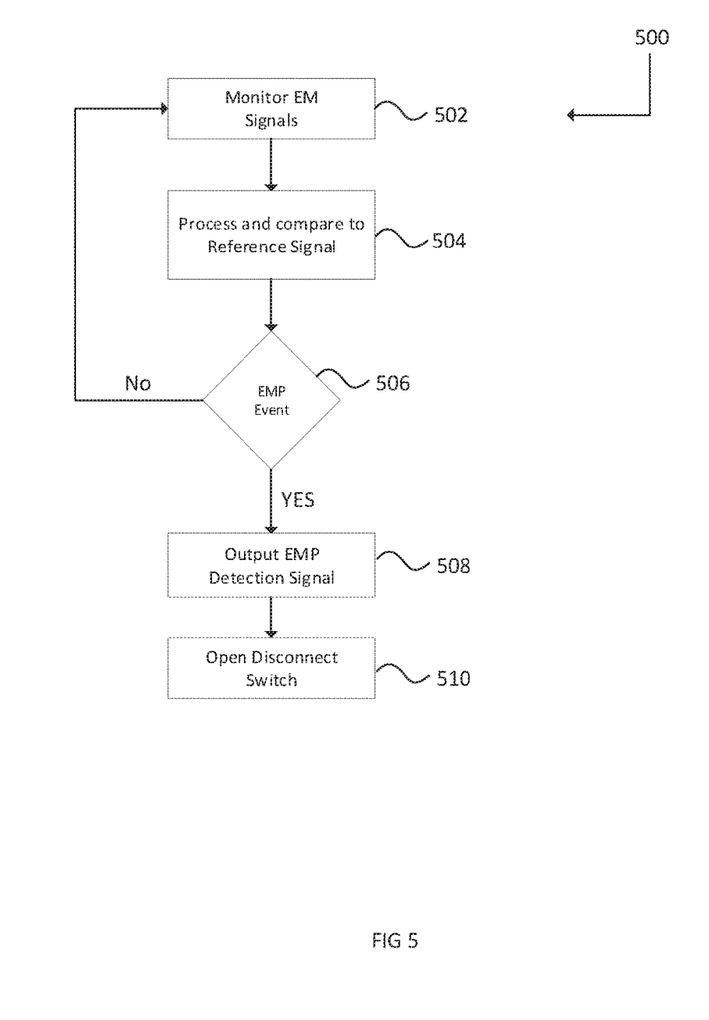
FIG. 5 is a flowchart of representative steps that can be carried out to protect a cellular tower site from an EMP event according to exemplary embodiments disclosed herein.

Operation of the EMP protection apparatus according to an embodiment of the disclosure is further depicted in flowchart 500 of FIG. 5. In block 502, antenna array 110 monitors electromagnetic signals. When an electromagnetic signal is received, it is processed and compared to a reference signal (e.g., an EMP E3 signal component) in block 504 (e.g., via operation of EMP detection circuit 114 as described above).

Decision block 506 considers whether the received electromagnetic signal is, or is not, indicative of an EMP event (e.g., whether there is a sufficient match between the received electromagnetic signal and the reference electromagnetic signal to conclude that an EMP event exists). If not (the "NO" exit from decision block 506), the process returns to block 502.

If the received electromagnetic signal is indicative of an EMP event, the process follows the "YES" exit from decision block 506 and EMP detection circuit 114 outputs the EMP detection signal in block 508. In block 510, disconnect switch 116 receives the EMP detection signal and opens, thereby isolating remote radio head 104 from base station equipment 106.

Although several embodiments have been described above with a certain degree of particularity, those skilled in the art could make numerous alterations to the disclosed embodiments without departing from the spirit or scope of this invention.

For example, when disconnect switch 116 is triggered, an alarm notification can be sent from base station equipment 106 to remote NOC 108. Similarly, once the EMP event has dissipated, a user at remote NOC 108 can communicate a command to base station equipment 106 that resets disconnect switch 116 and reestablishes the conductive connection between remote radio head 102 and base station equipment 106.

All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A system for protecting a cellular tower site, including a remote radio head conductively connected to a base station, from an electromagnetic pulse ("EMP") event, the system comprising:
   an antenna array;
   an EMP detection circuit in communication with the antenna array and operable to output an EMP detection signal, wherein the EMP detection circuit comprises a comparator configured to compare an electromagnetic signal received by the antenna array to a reference signal, and wherein the reference signal comprises an EMP E3 signal component as defined by the International Electrotechnical Commission; and
   a disconnect switch in communication with the EMP detection circuit, wherein the disconnect switch is configured to be conductively connected between the remote radio head and the base station, and wherein the disconnect switch is configured to physically interrupt the conductive connection between the remote radio head and the base station upon receipt of the EMP detection signal from the EMP detection circuit.

2. The system according to claim 1, wherein the antenna array comprises a plurality of magnetic loop antennas.

3. The system according to claim 2, wherein the plurality of magnetic loop antennas are EMP-shielded.

4. The system according to claim 1, further comprising an EMP-shielded enclosure, and wherein the EMP detection circuit is contained within the EMP-shielded enclosure.

5. The system according to claim 1, wherein the disconnect switch comprises an electromechanical switch.

6. The system according to claim 1, wherein the disconnect switch is further configured to physically interrupt the conductive connection between the remote radio head and the base station when power to the disconnect switch is interrupted.

7. The system according to claim 1, wherein the EMP detection circuit is connected to the disconnect switch via an optical connection.

8. The system according to claim 1, wherein the comparator is configured to compare a frequency of the electromagnetic signal received by the antenna array to a frequency of the reference signal.

9. The system according to claim 1, wherein the comparator is configured to compare a pulse duration of the electromagnetic signal received by the antenna array to a pulse duration of the reference signal.

10. The system according to claim 1, wherein the EMP detection circuit outputs the EMP detection signal when a pulse duration of the electromagnetic signal received by the antenna array matches a pulse duration of the EMP E3 signal component.

11. A method of protecting a cellular tower site from an electromagnetic pulse ("EMP") event, wherein the cellular tower site includes a remote radio head conductively connected to a base station, the method comprising:
connecting an EMP monitoring system to the cellular tower site, wherein the EMP monitoring system comprises:
an antenna array;
an EMP detection circuit in communication with the antenna array and operable to output an EMP detection signal; and
a disconnect switch in communication with the EMP detection circuit, wherein the disconnect switch is conductively connected between the remote radio head and the base station;
monitoring electromagnetic signals received at the antenna array via the EMP detection circuit to detect an EMP event;
the EMP detection circuit outputting the EMP detection signal to the disconnect switch when the EMP detection circuit detects the EMP event; and
the disconnect switch operating to physically interrupt the conductive connection between the remote radio head and the base station upon receipt of the EMP detection signal from the EMP detection circuit.

12. The method according to claim 11, wherein monitoring electromagnetic signals received at the antenna array via the EMP detection circuit comprises the EMP detection circuit comparing an electromagnetic signal received at the antenna array to a reference signal.

13. The method according to claim 12, wherein the reference signal comprises an EMP E3 signal component.

14. The method according to claim 13, wherein the EMP detection circuit outputs the EMP detection signal to the disconnect switch when a pulse duration of the electromagnetic signal received at the antenna array matches a pulse duration of the EMP E3 signal component.

15. The method according to claim 11, further comprising the disconnect switch operating to physically interrupt the conductive connection between the remote radio head and the base station when power to the disconnect switch is interrupted.

16. The method according to claim 11, further comprising the disconnect switch operating to physically restore the conductive connection between the remote radio head and the base station after the EMP event has abated.

17. A cellular tower site, comprising:
a base station;
a remote radio head conductively connected to the base station;
an antenna array;
an EMP detection circuit in communication with the antenna array and operable to output an EMP detection signal; and
a disconnect switch in communication with the EMP detection circuit and conductively connected in series between the base station and the remote radio head,
wherein the disconnect switch is configured to open the conductive connection between the remote radio head and the base station upon receipt of the EMP detection signal from the EMP detection circuit, and is further configured to open the conductive connection between the remote radio head and the base station when power to the disconnect switch is interrupted.

* * * * *